March 10, 1925.
W. J. DRUCKER
BONE SAWING MACHINE
Filed June 6, 1923 4 Sheets-Sheet 2
1,529,303
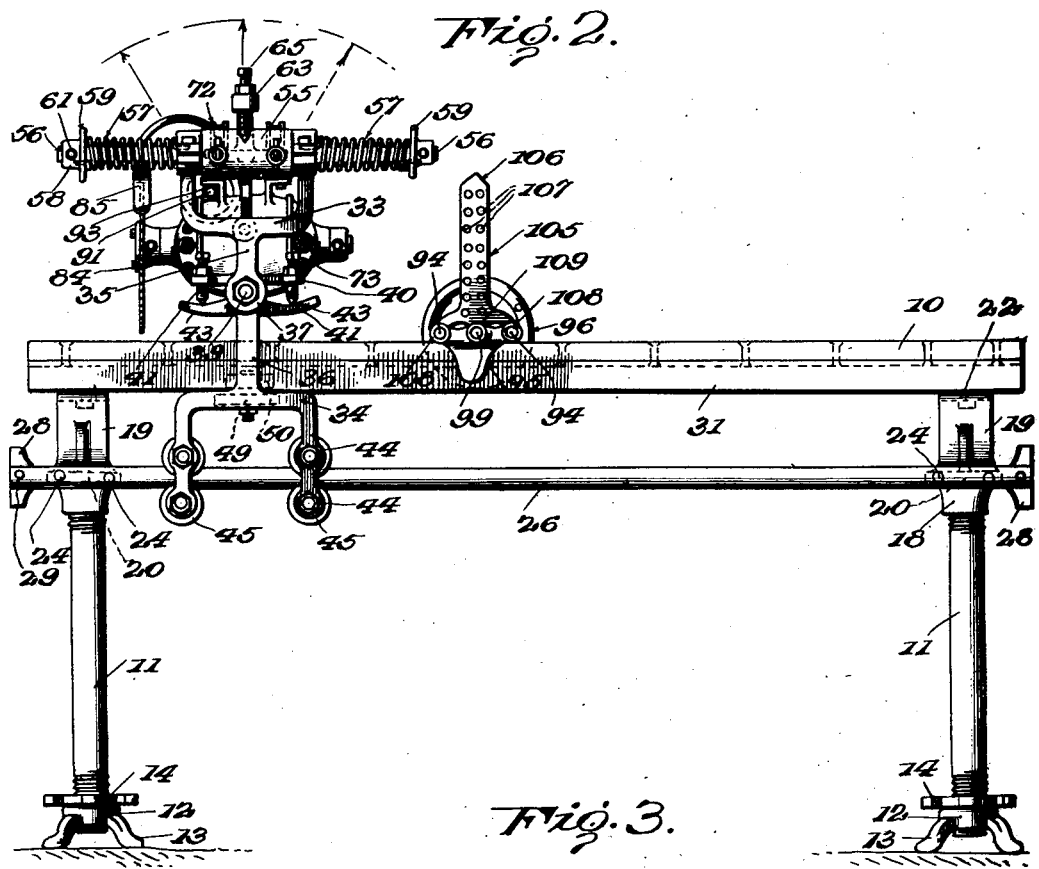
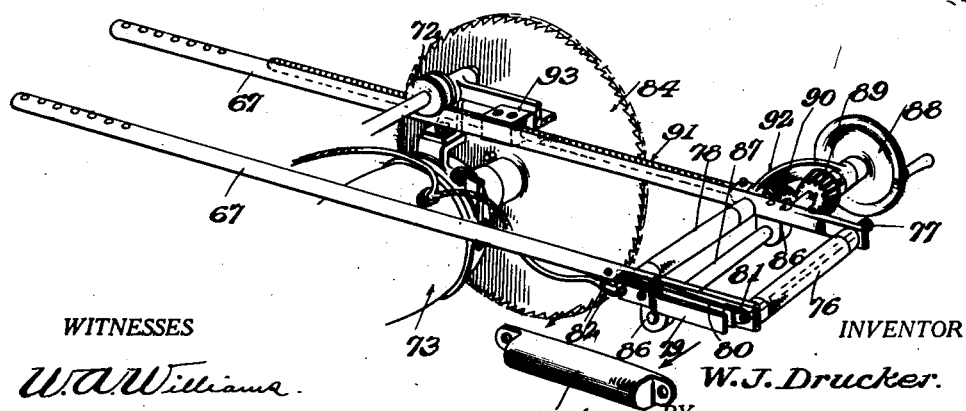
WITNESSES
W. A. Williams
INVENTOR
W. J. Drucker.
BY
Munn & Co.
ATTORNEYS

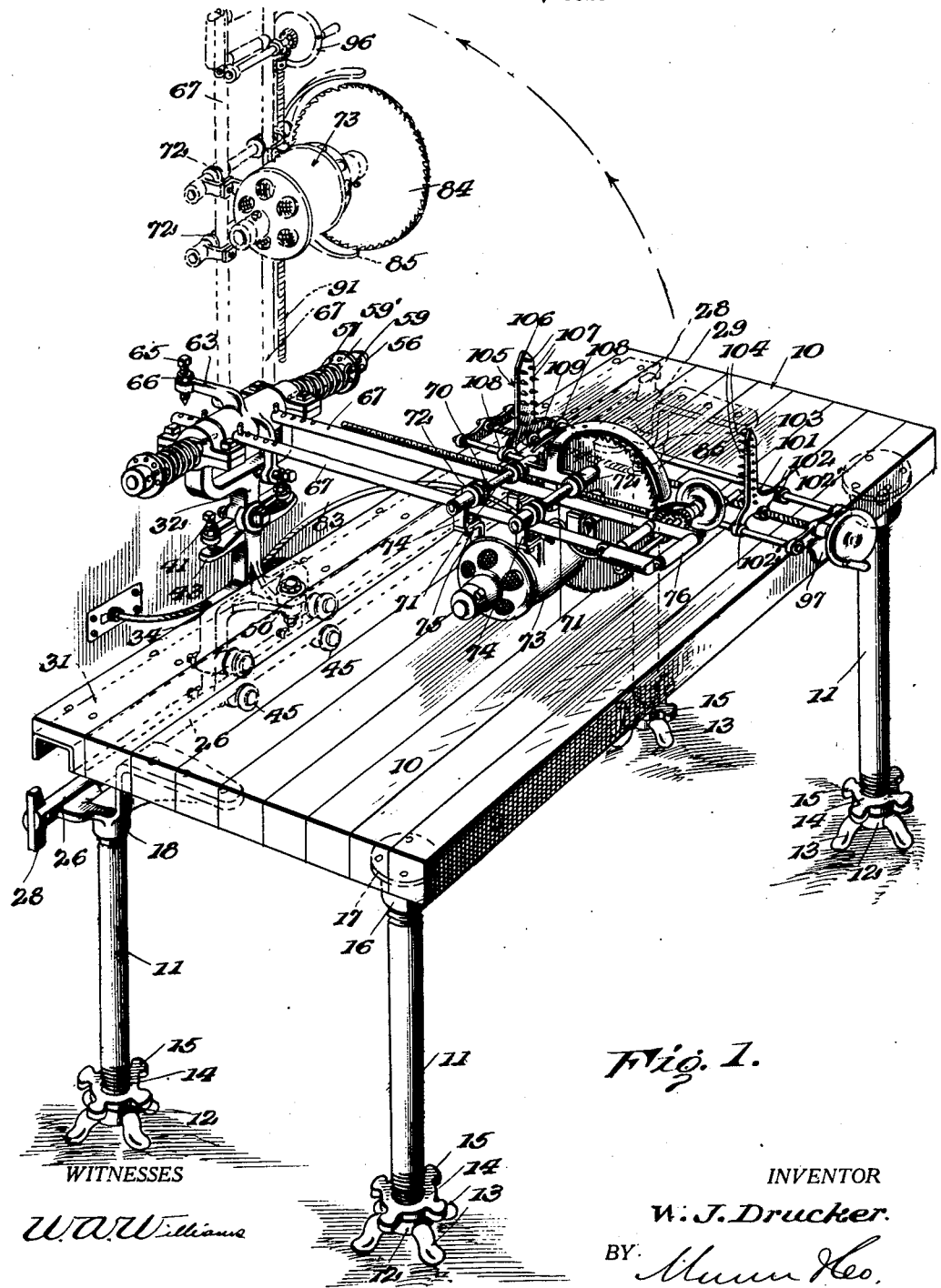

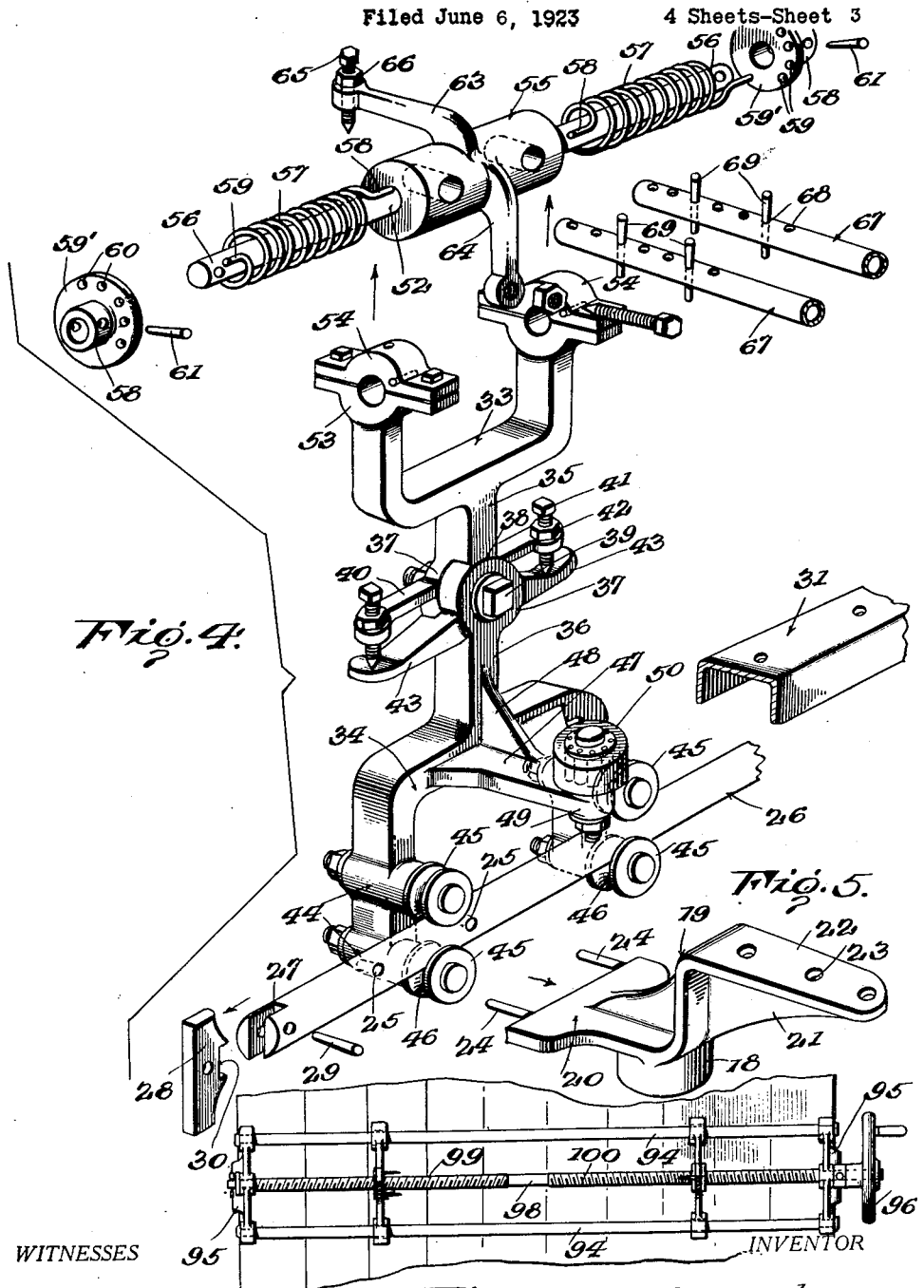

March 10, 1925.

W. J. DRUCKER

BONE SAWING MACHINE

Filed June 6, 1923  4 Sheets-Sheet 4

1,529,303

WITNESSES
W. A. Williams

INVENTOR
W. J. Drucker.
BY
ATTORNEYS

Patented Mar. 10, 1925.

1,529,303

UNITED STATES PATENT OFFICE.

WILLIAM J. DRUCKER, OF PITTSBURGH, PENNSYLVANIA.

BONE-SAWING MACHINE.

Application filed June 6, 1923. Serial No. 643,717.

*To all whom it may concern:*

Be it known that I, WILLIAM J. DRUCKER, a citizen of the United States, residing at Pittsburgh, in the county of Allegheny and State of Pennsylvania, have invented certain new and useful Improvements in Bone-Sawing Machines, of which the following is a specification.

This invention relates to bone sawing machines.

The invention more particularly relates to improvements in the bone sawing machine shown and described in my co-pending application, Serial Number 629,502, filed April 2, 1923.

In carrying out the invention there is provided a table upon which there is longitudinally movable a rotary saw, said saw being supported for swinging movement and thereby to permit the same to be swung clear of the table and thus permit the table to be used for other purposes, such as would arise at a butcher's retail "stand" or store.

An object of the invention is to provide means to enable the saw and associated parts to be easily and expeditiously shifted longitudinally of the associated table and thus enable the operator to quickly position the saw with relation to the bone to be operated upon.

It is a further and important object of the invention to provide means whereby the saw may be shifted transversely of the associated table in an accurate and continuous manner and thereby enable a bone to be split or sawed lengthwise or permit sawing a bone with a relatively large cross section in a rapid manner.

A still further object of the invention is that the legs of the table be adjustable and thereby enable the table to be level when placed upon an uneven floor.

Another object of the invention is to provide means for clamping meat upon the table and thus enable the bones of the meat to be more efficiently operated upon.

Other objects, and objects relating to details of construction, combination and arrangement of parts will hereinafter appear in the detailed description to follow.

Figure 7:
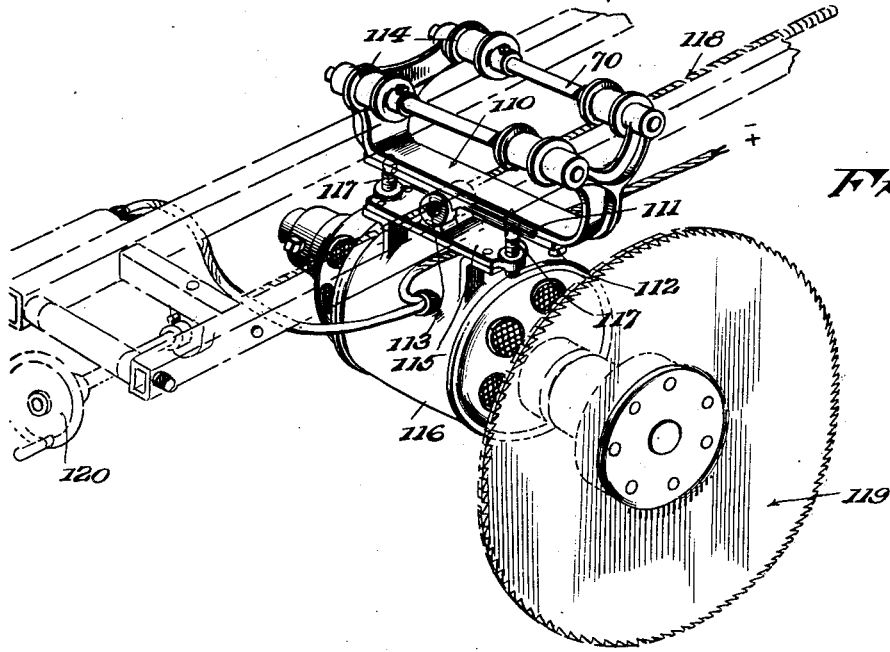
Figure 8:
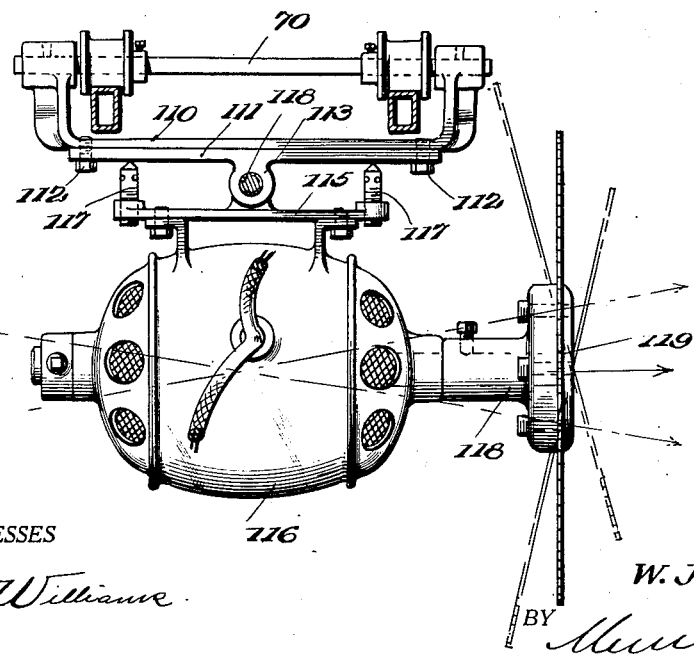

The invention is illustrated by way of example in the accompanying drawings, in which:

Figure 1 is a perspective view of the bone sawing machine or apparatus embodying the present invention, Figure 2 is a view in rear elevation of the same but showing the saw and meat clamp in different positions than shown in Figure 1, Figure 3 is a detail perspective view illustrating the means employed for moving the saw transversely of the associated table, Figure 4 is a group view showing in perspective the pivoted carriage for the bone saw together with associated parts of said carriage, Figure 5 is a detail perspective view of a casting employed upon each rear leg of the table and at the upper end thereof, Figure 6 is a fragmental top plan view of the table and illustrating the meat clamp when positioned thereon, Figure 7 is a detail perspective view illustrating a modified form of means for shifting the saw transversely of the associated table and also a modified means for tilting the saw, and Figure 8 is a vertical sectional view taken forward to the saw and associated electric motor and further illustrating the modified means shown in Figure 7.

Referring to the drawings in detail, 10 indicates generally a table top and 11 the supporting legs therefor. The table top 11 may be of any desired construction and preferably the dimensions of Figure 1. Each leg 11 is preferably of metal and cylindrical in shape, and upon the lower end of each leg is threaded a collar 12 having a plurality of projections 13 extending downwardly therefrom, whereby to provide feet. Also each leg has threaded thereon a collar 14 which is positioned above the associated collar 12 and which is provided with a plurality of protrusions 15 to enable the same to be easily rotated. The collar 14 in each instance is provided for locking the collar 12 against rotation as is obvious. The upper end of each forward leg 11 has threaded thereon a collar or sleeve 16 which terminates at its upper end in a laterally extending flange 17 whereby the same may be bolted or otherwise secured to the table 10.

Each rear leg 11 of the table also has a collar or sleeve 18 threaded upon its upper end, and this sleeve in each instance is formed as best shown in Figure 5 with an L-shaped bracket member 19 and also with a plate 20 extending laterally therefrom. The L-shaped bracket member 19 is reinforced by a suitable web formation 21 and the horizontal portion 22 of each bracket is provided with a plurality of openings 23, whereby the same may be bolted or otherwise secured to the table 10. Also each plate extension 20 is provided with a pair of pins or studs 24 adapted to be extended through transverse openings 25 formed in the associated end of a supporting rail 26. The supporting rail 26 is preferably circular in cross section and each end of this member is provided with a recess or socket 27 adapted to receive a plate member 28. The plate member 28 is adapted to serve as a stop in each instance for the carriage carried by the rail 26, and each plate member is held against removal from its associated socket 27 by the means of a pin 29. Also each plate member is provided upon its inner edge with a recess 30, whereby to permit portions of the plate to overlap the rail 26 and thus insure a more solid securing of said plate member.

It will be noted that the rear legs 11 of the table are inwardly spaced with relation to the rear and longitudinal edge of said table. Upon the inner side of the rail 26 there is secured to the bottom side of the table 10 a guide member 31, said guide member being in the form of an inverted channel and preferably the lower surface of the table is recessed in order to accommodate this channel member and thus permit the lower edges of the channel member to be flush with the lower surface of the table, as illustrated to advantage in Figure 1. The channel member 31 may be secured to the table in any desired manner, preferably by rivets, as shown.

The pivoted carriage for the rotary saw and associated parts, generally indicated by the reference numeral 32, comprises a pair of U-shaped members or castings 33 and 34, the casting 33 being positioned above the casting 34 and the casting 34 being inverted as shown. The bridge portion of each casting 33 and 34 is provided with an extension 35 and 36, respectively, and each extension terminates at its outer end in a ring 37 which is in offset relation to one side or edge of the associated extension in each instance and thereby to provide a shoulder 38, said shoulder in each instance presenting an arcuate surface. The rings 37 are fitted together as illustrated in Figure 4 and a bolt 39 is extended through said rings, whereby to secure the same together and permit relative movement thereof. The ring 37 of the casting 33 is provided with a pair of diametrically opposed extensions 40, each extension carrying at its outer end a set screw 41 and said set screw having threaded thereon a lock nut 42. The ring 37 of the casting 34 is also provided with a pair of diametrically opposed extension arms 43 with which the set screws 41 may be brought to engage and thereby adjust the position of the casting 33 with relation to the casting 34.

The casting or U-shaped member 34 has each of its legs provided with a pair of sleeve formations 44, each of which is adapted to accommodate a pin and said pin being secured therein and its one end extended and carrying a roller 45, said rollers being each provided with an annular groove 46 and each pair of rollers adapted to accommodate therebetween the rail 26 and thereby to provide means for movably supporting the carriage 32 upon the rail 26.

The bridge portion of the U-shaped casting 34 is provided with a laterally extending arm 47 which is reinforced by a web plate 48 which terminates at its outer end in a collar formation 49, whereby to support a pin for journalling the roller 50. The roller 50 has ball bearings or the like. The roller 50 is adapted to move in the channel member or guide 31 and thus prevent tilting of the carriage 32. Preferably the roller 50 is slightly less in diameter than the distance between the side portions of the channel member 31, for a purpose which will later become apparent.

The leg portions of the U-shaped member 33 journal a shaft 52, each of said leg portions terminating in a shaft bearing formation 53 whereby the shaft 52 may be rotatably supported and each bearing formation 53 is provided with a cap 54 which is bolted thereto in a manner shown. The shaft 52 has formed at a point central to its length a cylindrical enlargement 55, the length of which substantially corresponds to the distance between the leg portions or U-shaped casting 33. Upon each end portion 56 of the shaft 52 there is positioned a coil spring 57, said coil spring in each instance having its inner end terminating in a portion or projection 58 which is disposed parallel to the shaft 52 and which is extended into a suitable opening or bore formed in the enlargement 55 of the shaft 52, as shown. The outer end of each spring 57 terminates in a projection 59 similar to the projection 58. Upon each end of the shaft 52 there is positioned a collar 58, said collar having formed therewith a laterally extending flange 59' which is provided with a plurality of openings 60 each of which is adapted to receive projection 59 upon the associated spring 57. Each collar 58 is held stationary upon the shaft 52 by a pin 61.

The enlargement 55 of the shaft 52 is formed with a pair of laterally extending arms 63 and 64, respectively. The arm 64 extends forwardly and downwardly, as shown, while the arm 63 extends rearwardly. Each arm 63 and 64 carries at its free end a set screw 65, and each set screw in turn carries a lock nut 66. The arms 63 and 64 are adapted upon rotation of the shaft 52 to engage with the bridge portion of the U-shaped member 33 and thereby limit the turning movement of the shaft 33 in each direction. This turning movement can further be adjusted by the set screws 65.

The cylindrical enlargement 55 of the shaft 52 is further provided with a pair of transverse openings, and through each opening there is extended the one end of a pipe 67. Each pipe is provided with a plurality of openings 68 adjacent its end extended through the shaft enlargement 55, and a pair of pins 69 is provided for each pipe, whereby to adjustably secure the same against longitudinal movement in the shaft enlargement 55. The pipes 67 serve as rails for the carriage, generally indicated by the reference numeral 70. The carriage 70, as best shown in Figure 1, comprises a pair of cross members 71, each of which carries a pair of rollers 72, said rollers being rotatable upon the members 71 and movable upon the rails or pipes 67. The cross members 70 support an electric motor 73 through the hangers 74, a pair of hangers being provided for each of the members 71. Each member 71 is further provided with an offset portion 75, and these offset portions are in close relation to the underside of the rails or pipes 67. The outer end of the pipes or rails 67 are connected by a grip member 76, said grip member being hollow and having movable therethrough a plunger member 77. The members 67 are further connected or secured together by a cross member 78 and one of the members 67 carries a pair of spring fingers 79 and 80, said spring fingers being secured to the members 67 at similar ends as shown and said members being insulated from each other and also insulated from the member 67 as likewise shown. The free ends of these spring fingers are in spaced relation with respect to each other and the free end of the spring finger 80 carries a projection 81 adapted to be engaged by the associated end of the plunger 77 and thereby permit the plunger 77 to be utilized for bringing the free end of the spring fingers together and electrically connecting the same. The spring fingers 79 and 80 each has connected thereto a wire 82, said wires 82 being so arranged that when electrically connected by the spring fingers 79 and 80 they will establish an electric circuit through the motor 73. The current for the motor 73 may be supplied through wires in the cable 83, and this cable may be taken from a wall plug if so desired, as illustrated in Figure 1 of the drawings. The cable 83 will, of course, be of sufficient length to permit movement of the motor 63 upon the rails 67. A cover 82' may cover the spring fingers 79 and 80. The one end of the armature shaft of motor 73 has rigidly secured thereto a rotary saw 84, and if desired a shield 85 may be provided for this saw.

The rails 67 may be each provided adjacent its outer end with a depending lug 86, and these lugs may be apertured whereby to receive a shaft or rod 87, said rod being secured against longitudinal movement in and desirable manner and having its one end extended with respect to the associated rail 67 and this extended end carrying a handwheel 88, whereby the rod may be rotated. The rod 87 further carries a bevelled pinion 89 which is adapted to constantly mesh with a pinion 90 carried upon the outer end of a screw rod 91. A tie link 92 may be extended between the shaft 91 and rod 87, said tie member having formed therewith a collar at each of its ends, as shown, whereby to journal the rod 87, and also the shaft 91. The screw rod 91 extends through a block 93 which has threads adapted to co-operate with the screw rod 91, whereby with the rotation of the screw rod 91 the block will be moved. The block 93 is secured to the saw carriage 70, and in this way the saw may be moved transversely to the table 10 in a continuous and uniform manner.

The meat clamp employed in connection with the bone saw comprises a frame including a pair of rods 94 which are secured together at similar ends in each instance by a cross member 95, each cross member having depending therefrom a plate 97 adapted to fit against the associated longitudinal edge of the table 10. Between the cross members 95 there is rotatably supported a rod 98, said rod carrying suitable means whereby to hold the same against longitudinal movement and at its one end carrying a handwheel 96. The rod 98 is provided with two screw threaded portions 99 and 100. The screw threaded portion 100 of the rod 98 is operatively connected with a clamp member 101, said clamp member being in the form of a plate having an interiorly threaded collar 102 formed therewith through which the screw threaded portion 100 of the rod 98 passes and also having a pair of collars 102' formed therewith, one for each of the rods 94. The collars 102' are adapted to freely slide upon the rods 94. The clamp 101 otherwise comprises an upstanding portion 103 which is provided with a row of vertically arranged teeth 104. With the screw-threaded portion 99 of the rod 98 there is operatively associated a second clamp member 105, said clamp member being similar in construction to the clamp member 101 with the exception that the upstanding portion 106 of this last-named clamp member is provided with two rows of teeth 107. The clamp member 105 is also provided with a pair of collars 108 through which the rods 94 extend and is further provided with a collar 109 interiorly threaded and adapted to receive the screw portion 109 of the rod 98. It should be here mentioned that the screw threaded portions 99 and 100 of the rod 98 are so arranged that with rotation of the rod 98 the clamp members 101 and 105 will move in opposite directions.

It should be noted that the pipes 67 and cross members therefor may be referred to as a frame.

In the use of the present device the table may be positioned at any convenient place in a butcher's retail shop or "stand" and the adjustable feature of the legs heretofore described should be then utilized for levelling the table, that is, in case that the floor upon which the table rests is not level. The meat clamp will now be positioned upon the table, and if it is desired to cut a slice in which a bone will occur then the meat may be clamped by clamp members 101 and 105 through rotation of the rod 98 by the handwheel 96. It is, of course, assumed that during this interval the rotary saw together with the motor 73 and rails 67 have been swung to the dotted line position which is maintained, due to the action of the springs 57 and the stop member 63, in an obvious manner. After the meat has been positioned and clamped as heretofore described, then the grip 76 may be grasped by the operator and the rails 67, together with the saw and electric motor, swung downwardly and forwardly, and at this time the saw may be brought in position with respect to the bone to be cut, that is, the carriage 32 may be moved together with the saw and associated operating means to the proper position with respect to the bone to be sawed. This may be done by the operator through the means of proper pressure on the outer end of the rails 67. During any longitudinal movement of the carriage 32 the roller 50 will engage the inner side flange of the chamber member 31 and this roller together with the rollers 45 will permit an exceedingly easy movement of the carriage 32 together with parts carried thereby. After the saw has been properly positioned then the same may be swung downwardly and the plunger 77 depressed whereby to start the electrical motor 73 and rotate the saw. The saw will, of course, operate to cut the bone being operated upon and any number of cuts may be made by merely adjusting the position of the carriage 32. In case that a bone is to be cut lengthwise or in case a bone having a relatively great cross section is to be cut, then the handwheel 88 may be manipulated for moving the saw transversely of the table and in this way cutting through the bone. It is, of course, obvious that the clamps 101 and 105 may be quickly manipulated for releasing the meat and repositioning the same. Also it is important to note that with clamps of this construction, that is, one clamp having two rows of teeth 107 and the other one row of teeth 104, the clamp members will efficiently engage upon the meat being clamped irrespective of the contour of the surface of said meat.

Referring to Figures 7 and 8 the parts of the same construction heretofore described are identified by the same reference numerals, and in this modified construction it will be seen that the carriage 70 supports therebeneath a plate 110, said plate member in turn having secured to the bottom side thereof a plate 111, the plate 111 being secured to the plate 110 by means of machine screws 112, and the plate 111 formed with a lug 113 which is interfitted with a similar lug 114 formed upon a plate 115. The plate 115 supports a motor 116 and at each end of the plate 115 there is carried a set screw 117. Through the lugs 113 and 114 there is threaded a screw rod 118, said screw rod being adapted to permit relative movement of the lugs 113 and 114 and thereby permit tilting of the motor 116. The set screws 117 are utilized for holding the electric motor in its adjusted position. The electric motor 116 has its shaft extended and a suitable hub 118 is secured upon this extended portion of the shaft and this hub is adapted for carrying a saw 119. With the construction shown in Figures 7 and 8 the screw rod 118 may be rotated through the means of a handwheel 120, and in this way the saw 119 may be moved transversely of the associated table. Also the saw may be tilted to assume the different angles shown in Figure 8.

It should be here mentioned that the saw may be tilted also with the structures shown in Figures 1 to 6, inclusive, by manipulating the set screws 41. The purpose of tilting the saw is to enable a slant cut to be made in the bone if so desired, and this particular arrangement of the saw is sometimes exceedingly convenient to retail butchers.

While I have shown and described the preferred form of my invention and also certain modifications thereof, it is to be understood that changes may be made in the general structure, combination and arrangement of parts by those skilled in the art without departing from the spirit of the invention as indicated by the appended claims.

I claim:

1. In an apparatus of the character described, a table, a rail supported beneath the table and contiguous to one side thereof, an inverted U-shaped casting, a pair of rollers carried by each leg of said casting and each pair of rollers adapted to receive the rail therebetween, whereby to support the casting for longitudinal movement upon said rail, means to prevent lateral movement of the casting, an arm extending upwardly from the bridge portion of the casting, a second U-shaped casting having its bridge portion pivotally connected to the upwardly extending arm of the first-named U-shaped casting, means for adjustably holding the second U-shaped member against swinging upon its pivot connection with said arm extending from the first named U-shaped member, a shaft supported between the leg portions of the uppermost U-shaped casting, an elongated frame secured to said shaft at its one end and adapted for swinging movement in a plane transversely to the table, a rotary saw supported by said frame, and power means whereby said saw may be rotated.

2. In an apparatus of the character described, a table, a rail supported beneath the table and contiguous to one side thereof, an inverted U-shaped casting, a pair of rollers carried by each leg of said casting and each pair of rollers adapted to receive the rail therebetween, whereby to support the casting for longitudinal movement, upon said rail, means to prevent lateral movement of the casting, an arm extending upwardly from the bridge portion of the casting, a second U-shaped casting having its bridge portion pivotally connected to the upwardly extending arm of the first-named U-shaped casting, a shaft supported between the leg portion of the uppermost U-shaped casting, an elongated frame secured to said shaft at its one end and adapted for swinging movement in a plane transversely to the table, a rotary saw supported by said frame, power means whereby said saw may be rotated, a pair of arms extending from the shaft and adapted to engage the associated U-shaped member, whereby to limit the swinging movement of said elongated frame in either direction, and a set screw carried by each of said arms whereby to regulate the moment said arms will engage said U-shaped member for limiting the swinging movement of said elongated frame.

3. In an apparatus of the character described, a table, a rail supported beneath said table and contiguous to one side thereof, an inverted U-shaped member, a pair of rollers carried by each leg of the U-shaped member, each pair of rollers adapted to receive the rail therebetween, whereby to permit the U-shaped casting to move longitudinally of said rail, an arm extending laterally from the bridge portion of said U-shaped casting, a roller carried at the free end of the arm, and an inverted channel member carried upon the bottom side of the table and in which the roller of the laterally extending arm is adapted to move and thereby prevent lateral movement of said U-shaped casting.

4. In an apparatus of the character described, a table, a rail supported beneath said table contiguous to one side thereof, an inverted U-shaped member, a pair of rollers carried by each leg of the U-shaped member, and each pair of rollers adapted to receive the rail therebetween, whereby to permit the casting to move longitudinally of said rail, means for preventing lateral movement of the casting, an arm extending upwardly from the bridge portion of the casting, a second U-shaped casting having an arm extended laterally from the bridge portion thereof, connecting means between the arm of the second-named casting and the first-named casting, whereby the second-named casting may be adjustably tilted in either direction, an elongated frame having its one end pivotally supported by the second-named U-shaped casting and said frame adapted for swinging movement in a plane transversely to the table, and a rotary saw carried by said frame, for the purpose described.

5. In an apparatus of the character described, a table, a rail supported beneath said table contiguous to one side thereof, an inverted U-shaped member, a pair of rollers carried by each leg of the U-shaped member, and each pair of rollers adapted to receive the rail therebetween, whereby to permit the casting to move longitudinally of said rail, means for preventing lateral movement of the casting, an arm extending upwardly from the bridge portion of the casting, a second U-shaped casting having an arm extended laterally from the bridge portion thereof, connecting means between the arm of the second-named casting and the first named casting, whereby the second-named casting may be adjustably tilted in either direction, a shaft pivotally supported between the leg portions of the second-named U-shaped member or casting, a frame having its one end rigidly secured to said shaft and adapted for swinging movement in a plane transversely to the table, coil springs carried by said shaft whereby to resist downward and forward swinging movement of said elongated frame, and a rotary saw supported by said frame, for the purpose described.

6. In an apparatus of the character described, a table, a rail supported beneath said table contiguous to one side thereof, an inverted U-shaped member, a pair of rollers carried by each leg of the U-shaped member and each pair of rollers adapted to receive the rail therebetween, whereby to permit the casting to move longitudinally of said rail, means for preventing lateral movement of the casting, an arm extending upwardly from the bridge portion of the casting, a second U-shaped casting having an arm extended laterally from the bridge portion thereof, connecting means between the arm of the second-named casting and the first-named casting, whereby the second-named casting may be adjustably tilted in either direction, a shaft pivotally supported between the leg portions of the second-named U-shaped member or casting, a frame having its one end rigidly secured to said shaft and adapted for swinging movement in a plane transversely to the table, adjustable spring means adapted to resist downward and forward swinging movement of said frame, and a rotary saw supported by said frame, for the purpose described.

WILLIAM J. DRUCKER.